No. 861,096.
PATENTED JULY 23, 1907.
A. M. DOW.
SAWMILL GAGE.
APPLICATION FILED JAN. 25, 1907.
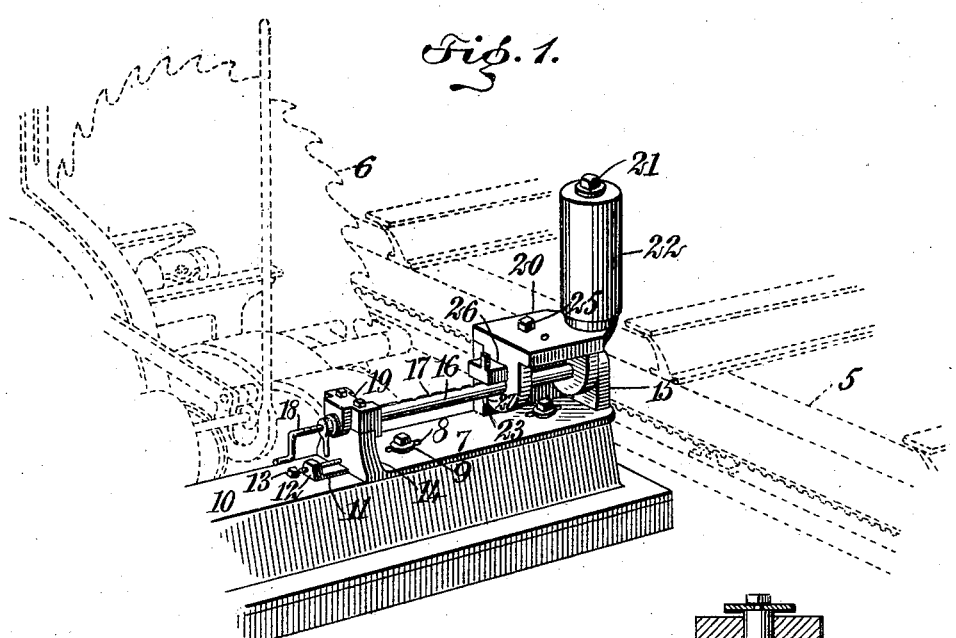
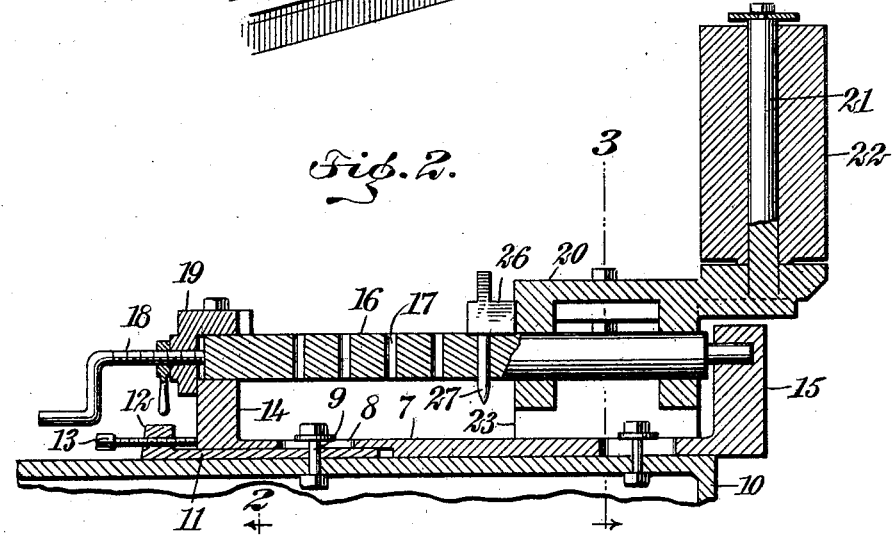
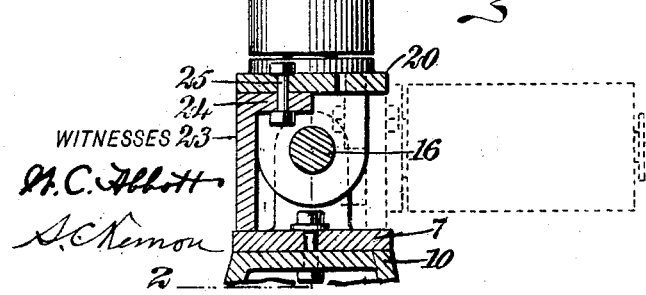
INVENTOR
Alexander M. Dow
BY
ATTORNEYS

UNITED STATES PATENT OFFICE.

ALEXANDER M. DOW, OF BURKETTVILLE, MAINE.

SAWMILL-GAGE.

No. 861,096.

Specification of Letters Patent.

Patented July 23, 1907.

Application filed January 25, 1907. Serial No. 354,050.

*To all whom it may concern:*

Be it known that I, ALEXANDER M. DOW, a citizen of the United States, and a resident of Burkettville, in the township of Appleton and State of Maine, have invented a new and Improved Sawmill-Gage, of which the following is a full, clear, and exact description.

This invention relates to improvements in gages for lumber saw machines, the object being to provide a gage of simple construction that may be quickly adjusted for different thicknesses of boards to be cut from logs.

I will describe a saw mill gage embodying my invention and then point out the novel features in the appended claims.

Reference is to be had to the accompanying drawings forming a part of this specification, in which similar characters of reference indicate corresponding parts in all the figures.

Figure 1 is a perspective view of a saw mill gage embodying my invention, a portion of the saw mechanism being indicated in dotted lines; Fig. 2 is a section of the device on the line 2—2 of Fig. 3; and Fig. 3 is a section on the line 3—3 of Fig. 2.

Referring to the drawing, 5 designates a saw mill carriage of the usual construction and 6 the circular saw. Arranged forward of the saw and at one side of the carriage is the gage or guide comprising a body plate 7, provided with slots 8 through which set bolts 9 pass, the said bolts engaging in the frame 10. Attached to the frame 10 and extended underneath the body plate 7 is an adjusting plate 11, having an upwardly extended lug 12 in which a set screw 13 operates, the said set screw engaging with an upright 14 on said body plate 7, and by this set screw the body plate may be adjusted as may be desired. Also extended upward from the body plate 7 opposite the upright 14, is an upright 15, and supported in the uprights 14 and 15 and movable lengthwise is a rod 16, provided with perforations 17. The rod 16 may be adjusted lengthwise, as here shown, by means of a screw rod 18, engaging in a tapped hole in a boxing 19 secured to the upright 14, the said screw rod engaging with the end of the rod 16.

Mounted on the rod 16 is a boxing 20, the said boxing being slidable on the rod, and on the end of the boxing adjacent to the carriage 5, is a spindle 21 on which the gage or guide roller 22 rotates. The frame carrying the roller consists of the upper portion 20 and a back plate 23, the said back plate having at its upper portion a horizontally disposed flange 24 provided with an opening to receive a fastening bolt 25. The said top plate 20 is provided with two perforations, through either one of which the bolt 25 may pass when it is desired to reverse the roller for different characters of work.

For quick adjustment of the frame carrying the roller, lengthwise of the rod 16, I employ a block 26, having a pin 27 for engaging in any one of the perforations 17, the said pin being arranged near one corner of the block, so that the surfaces of the block designed to engage against the end of the frame carrying the roller, may be adjusted for the different positions which it is desired that the frame shall occupy on the rod; in other words, the said block at its four sides or edges has different degrees of projection from the pin. By this construction, the sawyer standing in front of the machine may readily change the position of the block and therefore change the distance of the gage roller with relation to the log of the saw mill carriage.

In placing a log in the carriage, the roller may be turned downward, as indicated by dotted lines in Fig. 3.

Having thus described my invention, I claim as new, and desire to secure by Letters Patent:

1. A saw mill gage comprising a plate provided with longitudinal slots and having at each end upward projections, bolts traversing the slots for securing the plate to the carriage, an adjusting plate arranged beneath the first named plate and attached to the carriage, one end of said adjusting plate projecting beyond the first named plate and being provided with a lug, a set screw threaded through the lug and engaging the adjacent projection of the first named plate, a boxing secured to said last named projection, a rod provided with longitudinally alined perforations journaled in the boxing and the other projection, a rod threaded into the boxing and engaging the end of the first named rod, said last named rod having a cranked portion, a boxing slidably mounted on said first named rod, a spindle arranged vertically on the boxing, a roller journaled on the spindle, a block having a pin for engaging the perforations of the rod, and against which the boxing is adapted to rest, and a back plate detachably connected with the boxing.

2. A saw mill gage comprising a plate provided with longitudinal slots and having at each end upward projections, bolts traversing the slots for securing the plate to the carriage, an adjusting plate arranged beneath the first named plate and attached to the carriage, one end of said adjusting plate projecting beyond the first named plate and being provided with a lug, a set screw threaded through the lug and engaging the adjacent projection of the first named plate, a boxing secured to said last named projection, a rod provided with longitudinally alined perforations journaled in the boxing and the other projection, a rod threaded into the boxing and engaging the end of the first named rod, said last named rod having a cranked portion, a boxing slidably mounted on said first named rod, a spindle arranged vertically on the boxing, a roller journaled on the spindle, and a block having a pin for engaging the perforations of the rod, and against which the boxing is adapted to rest.

3. A saw mill gage comprising a plate adjustably mounted on the carriage, and having at each end upward projections, a boxing secured to one of the projections, a rod provided with longitudinally alined perforations journaled in the boxing, and the other projection, a rod provided with a cranked portion threaded into the boxing and engaging the end of the rod, a boxing slidably mounted on said first named rod, a spindle secured in a vertical position on the boxing, a roller journaled on the spindle, and a block having a pin for engaging the perforations of the rod, the edge of the block being adapted to be engaged by the boxing.

In testimony whereof I have signed my name to this specification in the presence of two subscribing witnesses.

ALEXANDER M. DOW

Witnesses:
MARY A. CARROLL,
ELIZABETH H. ROLLINS.